Sept. 13, 1960     C. H. JOHNSON     2,952,169

INDEXING MULTIPLE TOOL HOLDER

Original Filed Oct. 10, 1955     2 Sheets-Sheet 1

INVENTOR.
Charles H. Johnson
BY Andrus & Sceales
ATTORNEYS.

Sept. 13, 1960  C. H. JOHNSON  2,952,169
INDEXING MULTIPLE TOOL HOLDER
Original Filed Oct. 10, 1955  2 Sheets-Sheet 2
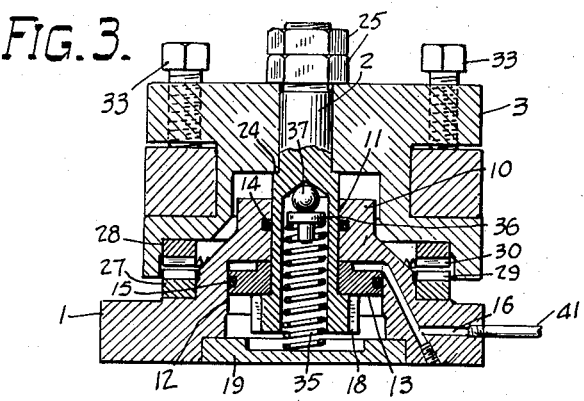
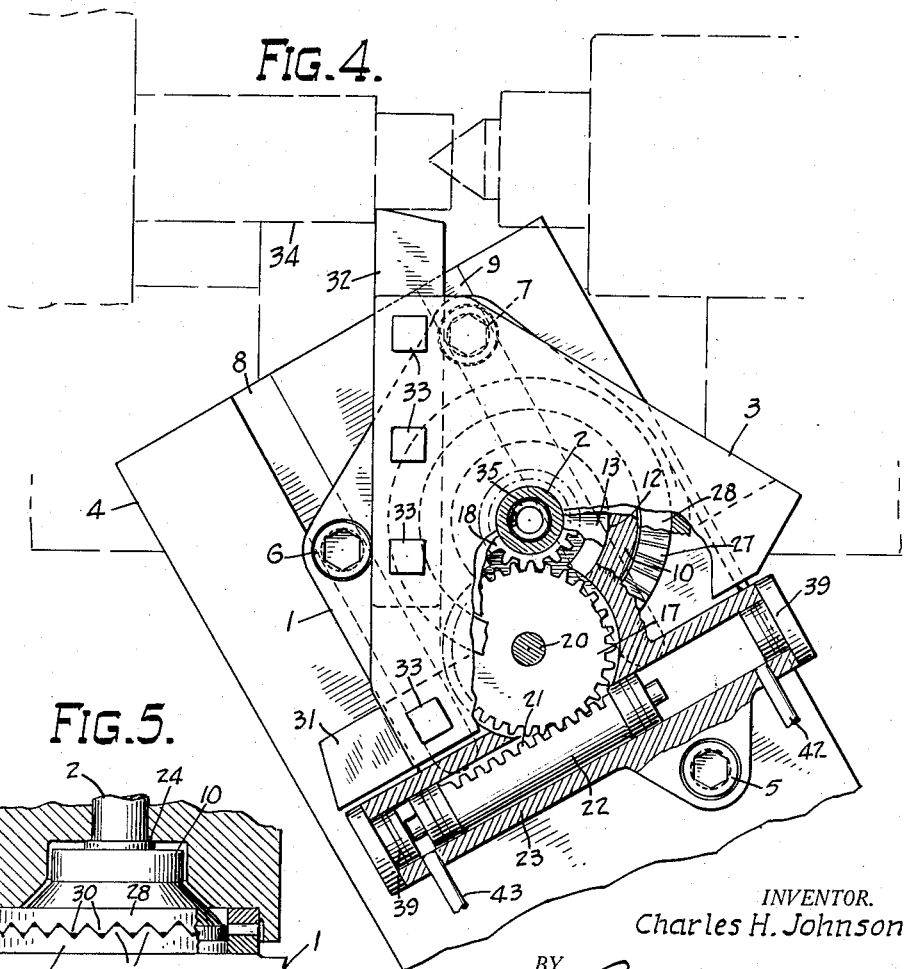
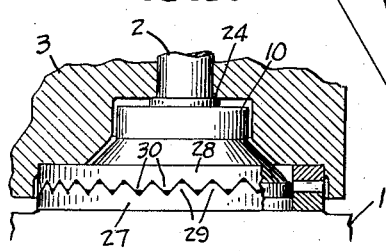
INVENTOR.
Charles H. Johnson
BY
*Andrus & Scealer*
ATTORNEYS.

United States Patent Office 2,952,169
Patented Sept. 13, 1960

2,952,169

INDEXING MULTIPLE TOOL HOLDER

Charles H. Johnson, Madison, Wis., assignor to Gisholt Machine Company, Madison, Wis., a corporation of Wisconsin Continuation of abandoned application Ser. No. 539,642, Oct. 10, 1955. This application Nov. 8, 1957, Ser. No. 696,586

1 Claim. (Cl. 74—822)

This invention relates to indexing multiple tool holders for use with automatic lathes and the like.

This application constitutes a continuation of application Serial No. 539,642, filed October 10, 1955, by the present applicant, now abandoned.

The invention has been employed in lathes where a workpiece is to receive a roughing cut followed by a finishing cut under the control of separate templates as set forth in the copending application Serial No. 534,419, filed September 15, 1955, by the present inventor, now abandoned in favor of a continuation application, Serial No. 785,549, filed December 31, 1958.

The invention provides a means whereby a roughing cut may be made by one tool and the finishing cut may be made by a fresh tool that has not been subjected to the severe wear of roughing operations. The accuracy of machining of a workpiece is thereby improved.

The invention provides means to effect the rotation of the tool block which carries the tools and means to move the block parallel to the axis of said rotation and into and out of locking engagement with the base of the tool holder.

For this purpose, in the embodiment illustrated, the tool block is mounted on a shaft rotatably carried by the base and movable axially by a piston operable within a cylinder carried by or formed within the base. The tool block and base are fitted with interengaging elements which secure the block in a given indexed position with respect to the base while fluid pressure is maintained within the cylinder to hold the block and the elements in such interengagement. Fluid pressure or a spring may be employed to move the block so that the respective elements are then disengaged and hydraulic means are provided to rotate the piston which turns the block to index the same. Fluid pressure is then re-applied to re-engage the elements and secure the block in the other indexed position.

In the drawings:

Fig. 3 is a vertical section taken on line 3—3 of Figure 1 and showing the tool block released for rotation to another indexed position;

Fig. 4 is a plan view similar to Figure 1 with the tool block in the other indexed position and with parts of the block and base broken away and sectioned to show the hydraulic cylinder and gear train for rotating the block to such indexed position; and Fig. 5 is a fragmentary view showing in elevation the elements of the base and tool block which interengage to secure the block in each position.

Figure 1:
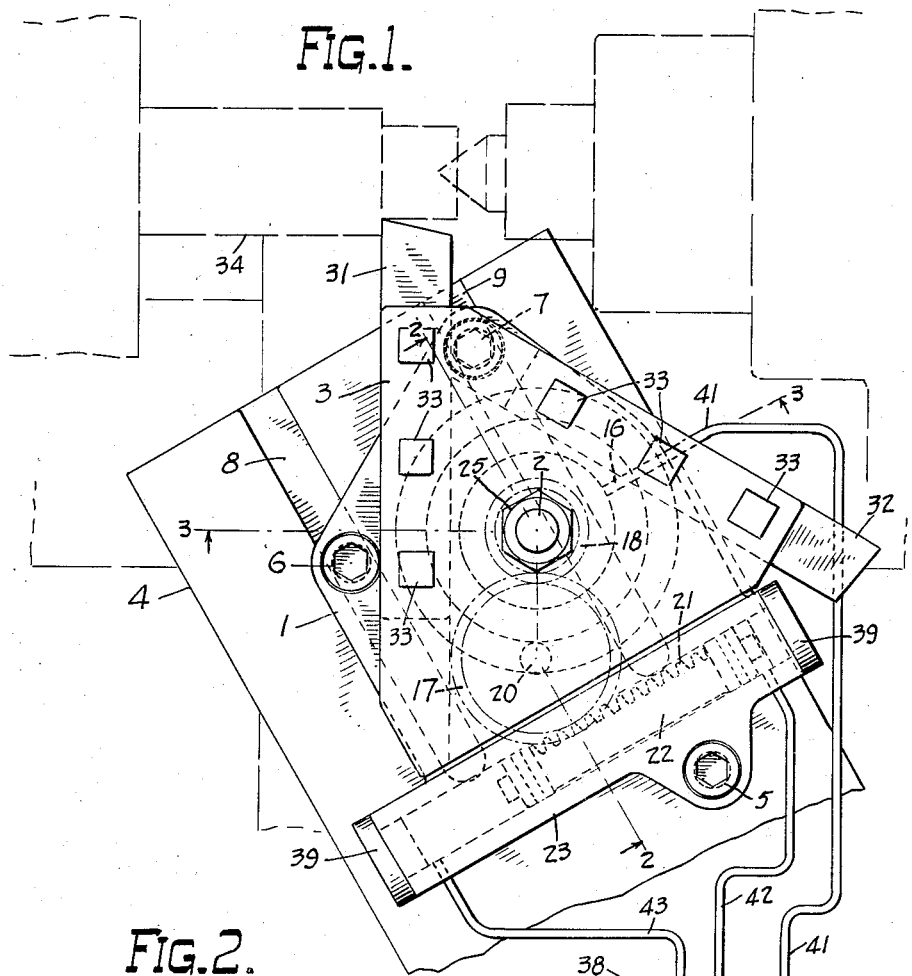
Figure 1 is a plan view of the tool holder mounted on the cross-slide of a lathe shown only in part, and with parts of the lathe and work shown in dotted lines and the hydraulic system for the holder shown diagrammatically.
Figure 2:
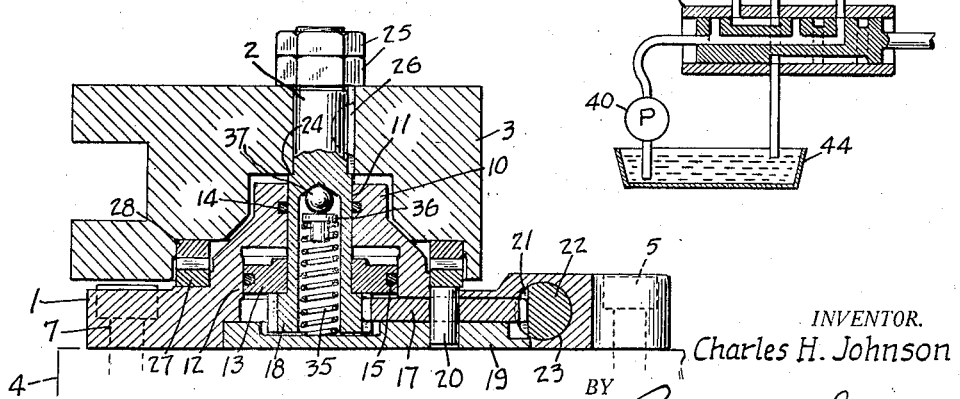
Fig. 2 is a vertical section taken on line 2—2 of Figure 1.

The multiple tool holder is shown as comprising a base 1 having a vertical indexing shaft 2 rotatably mounted therein and extending upwardly therefrom to carry the tool block 3.

The base 1 is mounted on the tool slide 4 by means of the screw 5 and the spaced bolts 6 and 7 having their heads disposed in corresponding T-slots 8 and 9 in the top of the slide.

The base 1 has an upstanding hollow pedestal 10 providing a bearing 11 for the rotation of shaft 2 therein. The bottom of base 1 is recessed concentric with the bearing 11 to provide a hydraulic cylinder 12 encircling the shaft and between the upper horizontal wall of the recess and a piston 13 on shaft 2.

The cylinder 12 is sealed against leakage by the O-ring 14 disposed in a groove in bearing 11 encircling shaft 2 and by a second O-ring 15 disposed in a circumferential groove in piston 13 and bearing against the outer circular wall of the recess in base 1.

A passage 16 ports pressure fluid to and from the cylinder 12.

The lower plate-like portion of base 1 has a recess in its bottom merging with the cylinder 12 and shaped to receive an idler gear 17 meshing with a pinion 18 on the lower end of shaft 2 below piston 13. A plate 19 closes the bottom of the recess and carries a pin 20 constituting the central shaft for gear 17.

The idler gear 17 is driven by means of a gear rack 21 on the side of a cylindrical piston 22 disposed to operate in a cylinder 23 at one side of the base 1. The piston 22 is double-acting and is adapted to reciprocate to opposite end positions in cylinder 23, as will be described more fully hereinafter.

The tool block 3 is secured to the upper end of shaft 2 by being confined between a shoulder 24 on the shaft and the nuts 25 threaded on the shaft. A key 26 prevents relative turning between tool block 3 and shaft 2.

The tool block 3 and shaft 2 are normally supported by a pair of index locking rings 27 and 28 of substantial diameter and concentric to shaft 2.

The lower ring 27 rests on base 1 and has a plurality of teeth 29 in its upper surface. The upper ring 28 is secured in a recess in block 3 and has teeth 30 in its lower surface generally complementary with teeth 29 and adapted to mesh therewith.

When the upper ring 28 is supported on lower ring 27 the teeth 30 and 29, respectively, prevent relative rotation of the rings and thereby prevent rotation of tool block 3.

The tool block 3 is generally triangular with two side edges grooved to receive the two cutting tools 31 and 32, and which are secured in place by the usual clamp screws 33. Each cutting tool 31 and 32 is disposed to be in a predetermined cutting relation to the workpiece 34 when it is indexed to operative position by turning of tool block 3 through 120°.

Turning of the tool block 3 is effected by the piston 22 through rack 21, idler gear 17, pinion 18 and shaft 2. When piston 22 is at one end of its cylinder 23 tool 31 is in operative cutting position and when piston 22 is at the opposite end of its cylinder 23 tool 32 is in operative cutting position.

In order to permit rotation of tool block 3 for indexing, the shaft 2 and the block 3 are raised sufficiently to disengage teeth 30 from teeth 29. For this purpose the shaft 2 is supported on a strong coil spring 35 extending vertically in a central bore in the lower end of the shaft and between plate 19 and a spring centering plug 36 which in turn supports a ball 37 bearing against the upper end of the bore and constituting a frictionless bearing support for the shaft.

The spring 35 is normally overcome by fluid pressure in cylinder 12 to maintain teeth 30 in interlocking engagement with teeth 29. When fluid pressure is released from cylinder 12 the spring 35 lifts shaft 2 and with it the block 3 to disengage teeth 30 from teeth 29.

In actuation, fluid pressure is maintained in cylinder 12 at all times during operation of the lathe except when it is desired to index the other tool. When it is desired to change tools by indexing the tool block, pressure fluid is first released from the cylinder 12 to let spring 35 lift the shaft 2 and block 3 and release the teeth 30 from teeth 29.

Thereupon, fluid pressure is ported through the control valve 38 to the piston end of cylinder 23 and the opposite end of the cylinder is ported to drain, to drive piston 22 to the opposite end of the cylinder and effect an index rotation of block 3 to present the opposite tool for a cutting operation.

Thereafter, pressure fluid is admitted to cylinder 12 and block 3 is pulled down against spring 35 to engage teeth 30 with teeth 29 and thereby lock block 3 against turning. By providing a number of teeth 30 divisible by three, and the same number of teeth 29, it is possible to always lock the block 3 by engagement of the teeth at the two index positions 120° apart.

The rack 21 should have a length approximating and somewhat exceeding one-third the circumference of pinion 18. The heads 39 in the opposite ends of cylinder 23 constitute stops for piston 22 as it moves from end to end of the cylinder.

When piston 22 is stopped by engagement with a head 39 there should be a slight over-travel for teeth 30 relative to teeth 29, but less than half a tooth pitch, so that upon engagement of the teeth under the clamping force exerted by fluid pressure admitted to cylinder 12 the piston 22 will move back away from the head 39 a very short distance. By providing a clearance between the piston 22 and the adjacent head 39 when teeth 30 are tightly engaged with teeth 29, as just described, the head 39 is prevented from interfering with locking of the tool block 3 and with the proper positioning of the corresponding tool.

The pinion 18 is of an axial length relative to the thickness or axial length of the idler gear 17 to provide for continued meshing of the same at all times having regard to the limited axial movement of shaft 2 and its pinion 18.

Valve 38 is operable either manually or automatically to provide the desired indexing of the tools. The valve may be of any suitable construction, that shown being a three-position spool valve adapted to supply power fluid from pump 40 through conduit 41 to passage 16 in base 1, or through conduit 42 to one end of cylinder 23 or conduit 43 to the other end of cylinder 23. When pressure fluid is supplied to conduit 41 conduits 42 and 43 are connected to drain going to sump 44. When pressure fluid is supplied to either conduit 42 or 43 the other conduit and also conduit 41 are connected to drain.

The invention provides an indexing tool holder that can be made of the required rigidity and strength and have a height for the tool corresponding to that normally present with standard lathes and slides.

The triangular shape for block 3 gives the maximum clearance for other lathe parts to avoid interference.

Various modes of carrying out the invention are contemplated as being within the scope of the following claim particularly pointing out and distinctly claiming the subject matter which is regarded as the invention.

I claim:

Indexing apparatus for a multiple tool holder mounted on a base for indexing rotation about a vertical axis selectively to one of two tool cutting positions, comprising, in combination, separate toothed locking means on said tool holder and on said base and with the teeth thereof interlockingly engageable to prevent relative rotation between the holder and base when the holder is at either indexed position, actuating means to selectively raise and lower said holder relative to said base to respectively disengage or engage both said locking means, motive means connected to said tool holder and selectively movable to one of a pair of positions corresponding to said two tool cutting positions, and stop means disposed to be engaged by said motive means when the latter reaches either of said pair of positions, the locking means on said tool holder being disposed relative to said motive means so that the teeth of the locking means on said tool holder will over-travel the teeth of the locking means on said base by less than half a tooth pitch when said motive means engages either stop means whereby said motive means will move away from the engaged stop means when said actuating means lowers said tool holder to lock the latter on said base.

References Cited in the file of this patent

UNITED STATES PATENTS

| | | |
|---|---|---|
| 2,309,998 | Tucker | Feb. 2, 1943 |
| 2,366,079 | Wilson | Dec. 26, 1944 |
| 2,392,228 | Casella | Jan. 1, 1946 |
| 2,423,367 | Bolender | July 1, 1947 |
| 2,438,644 | Oberwegner | Mar. 30, 1948 |
| 2,531,198 | Bruet | Nov. 21, 1950 |
| 2,540,586 | Lauterbur | Feb. 6, 1951 |
| 2,621,396 | Gracchi | Dec. 16, 1952 |

FOREIGN PATENTS

| | | |
|---|---|---|
| 118,352 | Australia | Apr. 20, 1944 |
| 465,389 | France | Feb. 5, 1914 |
| 498,920 | Great Britain | Jan. 11, 1939 |
| 726,224 | France | Feb. 29, 1932 |
| 1,132,553 | France | Nov. 5, 1956 |